Figure 1:
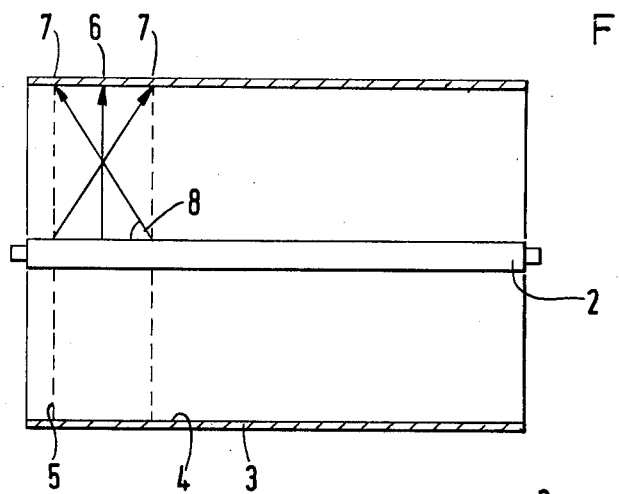

United States Patent [19]

Spence-Bate

[11] 4,032,234

[45] June 28, 1977

[54] PHOTOGRAPHIC DUPLICATORS

[76] Inventor: Harry Arthur Hele Spence-Bate, 1 Cheam Place, Morely, Australia, 6062

[22] Filed: July 8, 1975

[21] Appl. No.: 594,098

[30] Foreign Application Priority Data

July 10, 1974 Australia .......................... 8153/74

[52] U.S. Cl. .............................................. 355/117
[51] Int. Cl.² ........................................ G03B 27/22
[58] Field of Search ............. 355/117, 121, 89, 104

[56] References Cited

UNITED STATES PATENTS

| 2,168,481 | 8/1939 | Jollasse | 355/117 |
| 2,290,478 | 7/1942 | Matlas | 355/117 |
| 2,421,150 | 5/1947 | Jacobson | 355/117 |
| 2,990,763 | 7/1961 | Frantz | 355/117 UX |
| 3,401,617 | 9/1968 | Rait | 355/117 X |

FOREIGN PATENTS OR APPLICATIONS 502,749  3/1939  United Kingdom ............... 355/117

Primary Examiner—Donald A. Griffin
Attorney, Agent, or Firm—Fidelman, Wolffe & Waldron

[57] ABSTRACT

A photographic duplicating apparatus comprising a curved film holder for holding a master film and a copy film in close proximity to a preferably elongate tubular light source mounted at the center of curvature of the holder, a shutter which preferably consists of an inner and outer tube mounted coaxially one within the other in the axis of the light source. Preferably a series of units are provided each with an outer tube and holder which rotate sequentially about the inner tube and light source.

7 Claims, 7 Drawing Figures

PHOTOGRAPHIC DUPLICATORS

The present invention relates to devices for reproducing replicas from an original such as a photographic film which carries intelligence. Copies can be made on a duplicating box which consists of a light source and frame of one form or another, the object of the latter is to hold the original and the future copy in close contact. In order to achieve even illumination the light should be as distant as possible from the printing frame limited by an acceptable size of the box and light intensity fall-off. However, these requirements are incompatible, since the evenness of lighting on the frame area by increased distance from the light source, and effective light intensity are in opposition to one another. The present invention has an object lighting on the copy area while preventing light fall-off.

According to the present invention there is provided photographic duplicating apparatus comprising a curved holder for holding a master film and copy film in close proximity to a light source mounted at the centre of curvature of the holder, a curved shutter having a centre of curvature coaxical with that of the holder and light source and means for moving the shutter so as to cut off or allow the light from the source to impinge on the master film.

Preferably the shutter consists of an outer and inner tube mounted coaxially, which tubes may be interconnected by springs. In one embodiment the light source is a tubular lamp around which a plurality of said shutters and said holders are mounted. The light source is suitably a mercury vapour lamp.

In a preferred embodiment the holder comprises a curved glass plate having a centre of curvature coaxial with the light source and a flexible means arranged to press the master and copy films onto the glass plate. Access to the holder can be controlled by a time shutter.

Figure 1A:
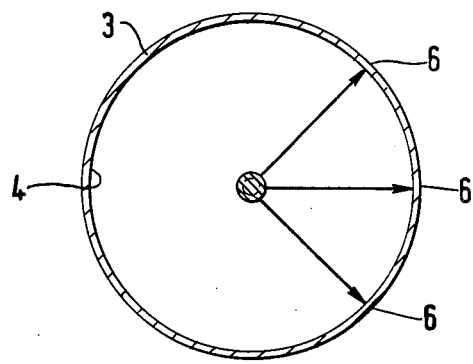
Figure 2:
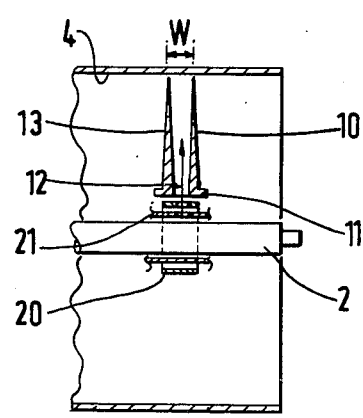
Figure 2A:
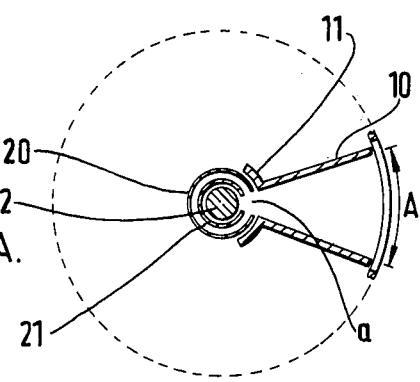
Figure 3:
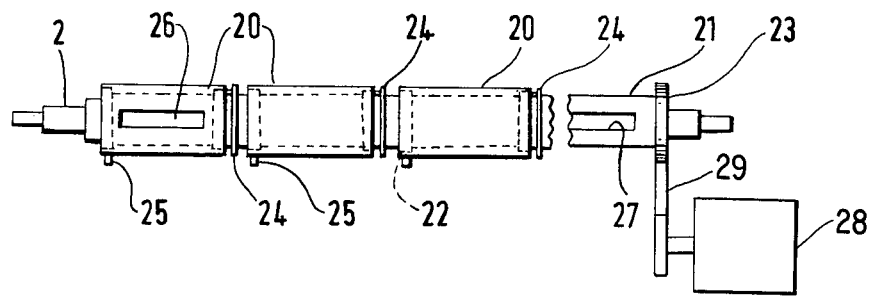
Figure 4:
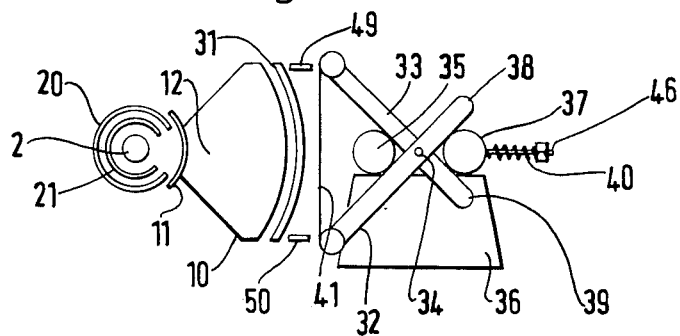
Figure 5:
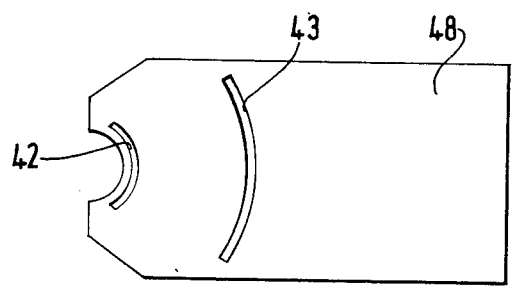

The invention will now be described in detail with reference to the accompanying drawings in which:

FIG. 1 is an explanatory diagram of the lighting arrangement of the duplicating apparatus recording to the invention, FIG. 1A is a cross section of FIG. 1, FIG. 2 is an axial cross section of the lamp mask and shutter arrangements of the apparatus according to the invention, FIG. 2A is an end cross section of FIG. 2, FIG. 3 an axial diagram of the shutter arrangement of the embodiment shown in FIG. 2, FIG. 4 is an end view of the apparatus shown in FIGS. 2 and 3, FIG. 5 is a mounting plate for a diamel unit for the apparatus shown in FIG. 4.

In FIG. 1 there is shown a cylinder 1 having a tubular lamp 2 of approximately the same length as the cylinder. The lamp 2 is placed in the centre of the cylinder 3 in such a manner that it stays equi-distant from the wall 4 of the cylinder 3 in its entire length. Thus it follows that an equal amount of radiation will reach the entire surface of the wall of the cylinder. For the purpose of explanation the cylinder will be divided into slices 5 such a slice is shown in FIG. 1A. If the slices 5 are of negligible thickness then the slices become circles and all the light rays are contained in the radii 6 and the angle and lengths at which the light hits the cylinder wall 4 are all equal. However if the slices are made wider in addition to the radii 6 other rays 7 spread out having lengths greater than the radii 6, the extreme and intermediate angles of incidence growing as the slice is made wider. In order to meet standards of resolution, the extreme angles 8 of incidence have to be controlled, and for certain diazo materials the angle 8 of extreme incidence, should not be less than 80° if the copy is to remain within the definition of certain high resolution requirements for duplicates. This angle 8 can be decreased if a larger degree of image deterioration is acceptable. Thus there is some flexibility in the dimensions and angles of a design but the essential principles remain which are the real subject of the invention. The control of the extreme angles of light incidence in one embodiment is controlled as will be seen by a masking element which is described with reference to FIG. 2. In FIG. 2 and 2A there can be seen a segmental masking element 10 which is mounted on a base 11. There are seven such elements mounted along the lamp 2 but only one is shown in FIG. 2. To cover most microfiche standards five elements need only be used. Each element has a radial dimensions of about 254 mm (10 inches) slightly smaller than the inner diameter of the wall 4 of the cylinder. The outer end of the elements 10 cover a width of a standard microfiche. It may be necessary to slightly wobble the elements 10 to avoid shadows. The element opens to an outer arc A (FIG. 2A) of 148 mm and has a slot 12 in the base 11 of an inner arc $a$ (FIG. 2A) of about 51 mm. The slot is 9.5 to 12 mm. long in the axial direction. Each side 13 of the element 10 preferably is approximately 6 mm thick where it meets the base and the sides extend outwards at this thickness for about 25 mm and then taper to an apex at the outer end of the element or element 10 may taper uniformly from the base to the apex as is shown in FIG. 2. By means of the segmental element 10 light incident on the inner wall 4 is limited, a gap of approximately 12 mm to 25 mm being interposed between each element 10 along the axial direction of the cylinder.

A shutter is provided between the base 11 and the lamp 2 and this is shown in detail in FIG. 3. The shutter for each channel consists of an outer tube 20 and an inner tube 21. The outer tube 20 is arranged to rotate freely about the inner tube by means of interposed bearings 22.

While the primary purpose of the shutter is to control the length of exposure in the present apparatus the shutter of the first channel is used to operate the feed to the second channel and second shutter in a waterfall arrangement. The particular feed arrangements will be described subsequentially. The arrangement of the shutters is such that, for example, if the exposure duration is 8 seconds and an operator can feed 4 masters and 4 copy films into the apparatus. In this time 4 channels would be provided to keep the operator working in an uninterrupted rythme. By the time the operator fed a master and copy film to the last channel the first one would be clear for the operator to recommence the cycle. If an automated feed is used or the operator was faster than two seconds per feed in then more channels would be provided.

The linkage between shutters of each channel is shown in FIG. 3, where inner tube 21 driven by wheel 23 acts as a common winding member and support for the individual outer tubes 20. The inner tube 21 and outer tubes 20 are connected to each other by leafsprings 24 which are coiled round the inner tube. Stops 25 are provided so as to lock the outer tubes 20 against rotation by the inner tube 21 and allow the inner tube to wind up the leaf-springs 24. As the inner tube rotates the outer tubes' springs 24 are constantly rewound. The inner tube 21 has an axially aligned elongate aperture 27 for each channel of a corresponding size to apertures 26 formed in the outer tubes. Alignment of the apertures 26 and 27 provides an open shutter while misalignment of the apertures closes the shutter. Synchronisation of the stops 25 is governed by the speed of rotation of the inner tube 21 which is suitably driven by a synchronous frequency regulated electric motor 28 connected to wheel 23 by drive means 29.

FIG. 4 shows the complete apparatus in which the holder for the master and copy films comprises a curved glass plate 31 having a centre of curvature coaxial with the lamp 2 and a flexible means 41 arranged to press the master and copy films onto the glass plate 31. The flexible means 41 is provided in the ends of arms 32 and 33 which are pivoted at 34 to maintain a tension on the flexible means 41. The flexible means 42 is suitably made from a textile material. The arms 32 and 33 press the flexible means onto the glass plate 31 by means of a roller 35 fixed to support 36 and a floating roller 37 and steadied by means of a guide 46 brazed to the fixed roller 35. Above and below the glass plate 31 and the flexible means 41 are respectively shutters 49 and 50 which control access to the holder. The shutters 49 and 50 are synchronised by time to the rotation of the inner tube 21. Thus it can be appreciated that as soon as shutter 49 is open the operator can feed a master and copy film into the holder for each channel in succession. Shutter 50 is opened as soon as the exposure has been made.

Each channel is provided with a support unit comprising an outer tube, masking element 10, mounted on a base 11 and a part cylindrical glass plate 31 together with an individual holder. The base 11 and glass plate 31 are mounted on individual side plates 48 (FIG. 5) by means of slots 42 and 43 respectively.

The film holder is particularly advantageous since the flexible means 41 contacts the master and copy film initially in the centre and progressively applies pressure towards the edges. Thus the air is progressively pressed out from between the master and copy and glass plate ensuring a good contact between these three articles.

While each channel is preferably placed side by side in an axial direction in order to make the apparatus more compact, it is possible to arrange each unit in radial position; for instance, a four channel arrangement would have units placed at 3 o'clock, 6 o'clock, 9 o'clock and 12 o'clock.

The glass plate 31 may also be of Quartz or other suitable translucent material. For diazo material, the ultra violet portion of the spectrum is important. For other films other wavelengths are important.

What I claim is:

1. A photographic duplicating apparatus comprising a curved holder for holding a master film and copy film in close proximity to a light source mounted at the centre of curvature of the holder, a curved shutter having a centre of curvature coaxial with that of the holder and light source, said shutter comprising an inner tube and an outer tube mounted coaxially one within the other, one of said tubes adapted for rotary motion relative to the other of said tubes, each of said tubes having a wall aperture whereby rotary motion of one of said tubes causes alignment of said apertures to open the shutter and further rotary motion causes nonalignment of said apertures to close the shutter, means for moving the shutter so as to cut off or allow the light from the source to impinge to a master film, and masking means including a plurality of masking elements, said elements comprising fin-like radial members extending from said outer tube to a point in close proximity to the inner surface of said transparent plate thereby limiting the angle of incidence of light from said tubular lamp striking said films to an angle greater than 80°.

2. Apparatus as claimed in claim 1 comprising a plurality of units each provided with a shutter and a holder, wherein each unit is mounted adjacent to the next unit in an axial direction along the light source which is a tubular lamp.

3. Apparatus as claimed in claim 1 wherein the light source is a mercury vapour lamp.

4. Apparatus as claimed in claim 1 wherein said holder comprises a curved, transparent plate and flexible means to press said master and copy films onto said plate.

5. Apparatus as claimed in claim 4 wherein the holder is provided with an upper inlet and lower outlet shutter, said shutters defining a closure between said transparent plate and said flexible means.

6. Apparatus as claimed in claim 4 wherein said flexible means comprises a textile material supported between two pivoted arm members whereby movement of said arm members causes said flexible means to first contact said master film and copy film in the center thereof and thereafter progressively applies pressure toward the edges of said films.

7. Apparatus as claimed in claim 1 wherein said radial members taper from said outer tube to an apex at the outer periphery of said member.

* * * * *